(12) United States Patent
Harikae

(10) Patent No.: US 8,336,593 B2
(45) Date of Patent: Dec. 25, 2012

(54) PNEUMATIC TIRE

(75) Inventor: Shinya Harikae, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 311 days.

(21) Appl. No.: 12/445,703

(22) PCT Filed: Nov. 19, 2007

(86) PCT No.: PCT/JP2007/072381
§ 371 (c)(1),
(2), (4) Date: Apr. 15, 2009

(87) PCT Pub. No.: WO2008/078476
PCT Pub. Date: Jul. 3, 2008

(65) Prior Publication Data
US 2010/0200140 A1 Aug. 12, 2010

(30) Foreign Application Priority Data
Dec. 27, 2006 (JP) .................. 2006-351115

(51) Int. Cl.
*B60C 9/18* (2006.01)
*B60C 9/20* (2006.01)
*B60C 9/22* (2006.01)
*B60C 9/26* (2006.01)
*B60C 9/30* (2006.01)

(52) U.S. Cl. ...................... 152/527; 152/536
(58) Field of Classification Search .................. 152/535, 152/527, 528, 529, 536
See application file for complete search history.

(56) References Cited

U.S. PATENT DOCUMENTS 4,183,391 A * 1/1980 Romand ................ 152/458
(Continued)

FOREIGN PATENT DOCUMENTS

EP 604228 A1 * 6/1994
(Continued)

OTHER PUBLICATIONS

Translation of Sakamoto, JP 05-338409 A, Dec. 1993.*
(Continued)

*Primary Examiner* — Joseph Del Sole
*Assistant Examiner* — Ryan Ochylski
(74) *Attorney, Agent, or Firm* — Greer, Burns & Crain, Ltd.

(57) ABSTRACT

There is provided a pneumatic tire capable of improving high-speed durability and noise characteristics.
The pneumatic tire has a belt-reinforcing structure 10 radially outwardly of belt plies 8 and 9, the belt-reinforcing structure 10 having organic fiber cords n spirally wound in the circumferential direction T of the tire. The belt-reinforcing structure 10 has an end reinforcement layer 10B disposed radially outwardly of each end region BE of the belt plies 8 and 9. The end reinforcement layer 10B has a two-layer structure in which its organic fiber cord nb formed of a hybrid cord is spirally wound from the axially inner side of the tire toward the axially outer side of the tire, is turned in an opposite direction at an edge 10*e* of the belt-reinforcing structure and is spirally wound from the axially outer side of the tire toward the axially inner side of the tire, and in which the opposite edges of the organic fiber cord nb are away inwardly in the axial direction of the tire from the edge 10*e* of the belt-reinforcing structure.

7 Claims, 3 Drawing Sheets

U.S. PATENT DOCUMENTS

| | | | | |
|---|---|---|---|---|
| RE30,615 | E | * | 5/1981 | Mirtain .................. 152/529 |
| 4,945,967 | A | * | 8/1990 | Tavazza et al. ............ 152/531 |
| 5,240,057 | A | * | 8/1993 | Watanabe ................ 152/531 |
| 6,186,205 | B1 | * | 2/2001 | Oshima et al. ............ 152/517 |
| 2003/0121583 | A1 | * | 7/2003 | Kanehira ................. 152/527 |
| 2005/0252593 | A1 | * | 11/2005 | Monnerie ................ 152/454 |
| 2006/0180261 | A1 | * | 8/2006 | Kwon et al. .............. 152/556 |

FOREIGN PATENT DOCUMENTS

| | | |
|---|---|---|
| JP | A 5-338409 | 12/1993 |
| JP | A 8-91013 | 4/1996 |
| JP | A 2003-220806 | 8/2003 |
| JP | A 2004-306634 | 11/2004 |
| JP | A 2005-319950 | 11/2005 |

OTHER PUBLICATIONS

Translaton of Fukui, JP 08-091013 A, Apr. 1996.*
Translation of Morita, JP 2003-220806 A, Aug. 2003.*
Translation of Takimura, JP 2004-306634 A, Nov. 2004.*
Translation of Sugitani, JP 2005-319950 A, Nov. 2005.*

* cited by examiner

PNEUMATIC TIRE

This application is a U.S. National Phase under 35 U.S.C. §371 of International Application No. PCT/JP2007/072381, filed Nov. 19, 2007.

TECHNICAL FIELD

The present invention relates to pneumatic tires, and more particularly, to a pneumatic tire capable of improving high-speed durability and noise characteristics.

TECHNICAL BACKGROUND

Large centrifugal forces act on a tire during running at high speed. Consequently, the tire inflates radially outward, causing outer diameter growth. As a result, the edges of a belt ply which receive stress concentrations are subject to occurrence of separation. Therefore, a belt-reinforcing structure having an organic fiber cord(s) spirally wound in the circumferential direction of the tire is conventionally provided radially outwardly of the belt ply as a cover member, whereby the outer diameter growth of the tire during running at high speed is restrained to thereby suppress occurrence of edge separation of the belt ply, obtaining high-speed durability.

As one example of the above conventional belt-reinforcing structure, there is known a belt-reinforcing structure having a center reinforcement layer disposed radially outwardly of a center region of the belt ply and end reinforcement layers disposed radially outwardly of opposite end regions of the belt ply. The center reinforcement layer has a cord of organic fiber greater in elongation (less in elastic modulus) such as nylon, and the end reinforcement layers have an organic fiber cord for which a hybrid cord is used, the hybrid cord having a filament of organic fiber greater in elongation such as nylon and a filament of organic fiber less in elongation (greater in elastic modulus) such as aramid fiber, the filaments being twisted together (see a patent document 1, for example).

By configuring the belt-reinforcing structure as described above, there are advantages that the organic fiber cords of the belt-reinforcing structure can follow lifting at the time of tire vulcanization, and that outer diameter growth in the ends of the belt ply where edge separation occurs is effectively restrained, enabling high high-speed durability to be provided. Further, vibration in the sidewall portions of the tire can also be suppressed, which contributes to a reduction in tire noise.

In recent years, there are strong requirements for further improvements in tire properties with improvements in vehicle performance. Further improvements in the above-mentioned high-speed durability and noise characteristics are also required strongly.

Patent Document 1: Japanese Patent Application Kokai Publication HEI 5-338409

DISCLOSURE OF THE INVENTION

Problems to be Solved by the Invention

An object of the present invention is to provide a pneumatic tire which can improve high-speed durability and noise characteristics.

Means for Solving the Problems

In order to achieve the above object, the present invention provides a pneumatic tire having a carcass ply, belt plies being disposed radially outwardly of the carcass ply in a tread portion, a belt-reinforcing structure being provided radially outwardly of the belt plies, the belt-reinforcing structure having organic fiber cords spirally wound in a circumferential direction of the tire, the belt-reinforcing structure comprising a center reinforcement layer and end reinforcement layers, the center reinforcement layer being disposed radially outwardly of a center region of the belt plies, the end reinforcement layers being disposed radially outwardly of end regions of the belt plies located on opposite sides of the center region in an axial direction of the tire, the center reinforcement layer having an organic fiber cord formed of organic fiber having an elastic modulus of 10000 MPa or less, each end reinforcement layer having an organic fiber cord formed of a hybrid cord, the hybrid cord having a filament of organic fiber with an elastic modulus of 10000 MPa or less and a filament of organic fiber having an elastic modulus higher than that of the organic fiber with an elastic modulus of 10000 MPa or less, the filaments being twisted together, wherein the end reinforcement layer has a two-layer structure in which the hybrid cord is spirally wound from an axially inner side of the tire toward an axially outer side of the tire, is turned in an opposite direction at an edge of the belt-reinforcing structure and is spirally wound from the axially outer side of the tire toward the axially inner side of the tire, and in which opposite edges of the hybrid cord are away inwardly in the axial direction of the tire from the edge of the belt-reinforcing structure.

Effect of the Invention

According to the present invention mentioned above, since the end reinforcement layer has a two-layer structure, outer diameter growth in the ends of the belt plies where edge separation occurs can be restrained more effectively than before. Accordingly, high-speed durability can be enhanced. Further, vibration in the sidewall portions can also be suppressed more effectively than before. Accordingly, tire noise can be reduced.

Since the opposite edges of the organic fiber cord of the end reinforcement layer are away inwardly in the axial direction of the tire from the edge of the belt-reinforcing structure that is subject to stress concentrations, occurrence of edge separation of the end reinforcement layer is restrained, enabling high-speed durability to be further improved.

DESCRIPTION OF THE SYMBOLS

| | |
|---|---|
| 1 | tread portion |
| 2 | sidewall portion |
| 3 | bead portion |
| 4, 5 | carcass ply |
| 8, 9 | belt ply |
| 10 | belt-reinforcing structure |
| 10A | center reinforcement layer |
| 10B | end reinforcement layer |
| 10B1 | first end reinforcement layer part |
| 10B2 | second end reinforcement layer part |
| 10e | belt-reinforcing structure edge |
| 11 | strip material |
| BC | center region |
| BE | end region |
| T | tire circumferential direction |
| f | reinforcing cord |
| n, na, nb | organic fiber cord |
| r | rubber layer |

BEST MODES FOR CARRYING OUT THE INVENTION

Embodiments of the present invention will be described in detail below with reference to the attached drawings.

Figure 1:
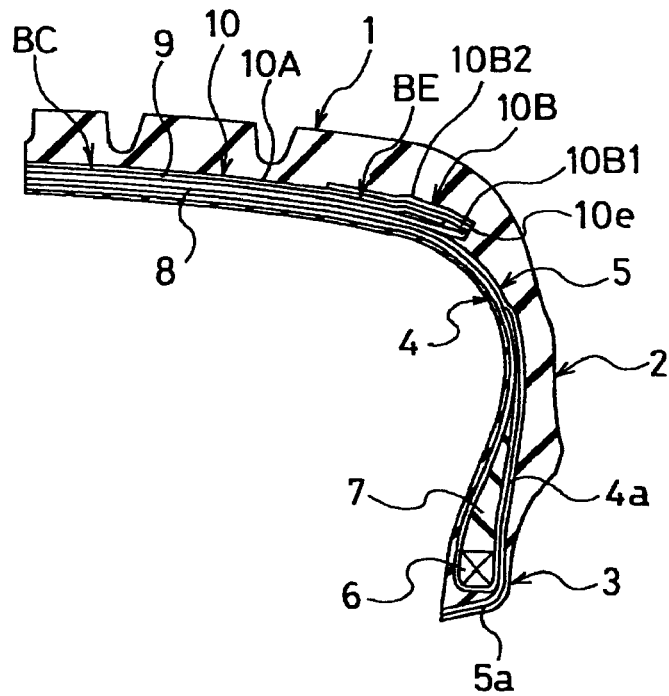
FIG. 1 is a partial cross-sectional view showing a first embodiment of a pneumatic tire according to the present invention.
Figure 2:
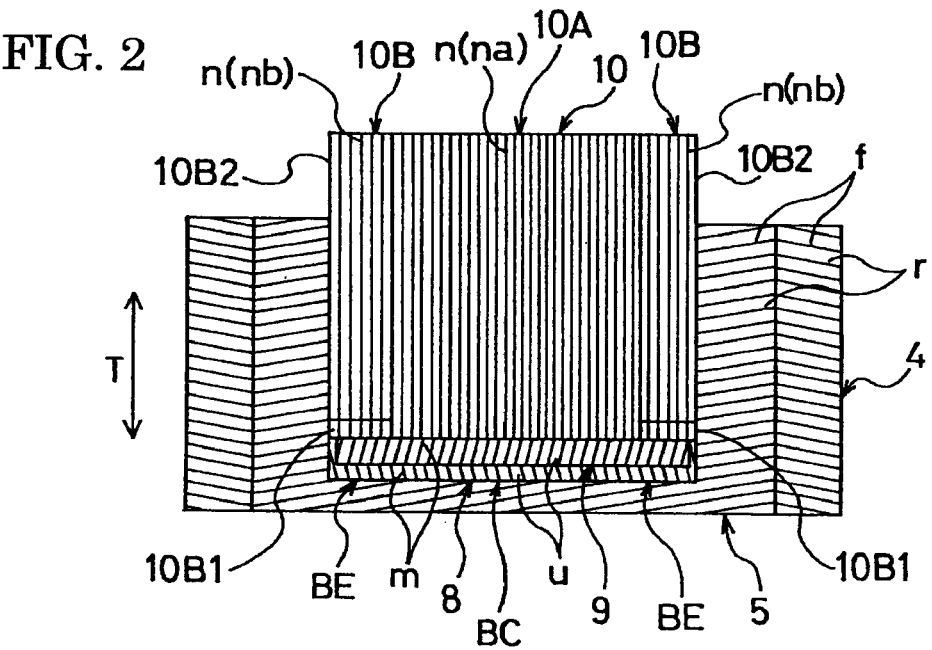
FIG. 2 is an explanatory drawing showing carcass plies, belt plies and a belt-reinforcing structure partially in a development state.

Referring to FIG. 1, there is shown an embodiment of a pneumatic tire according to the present invention; reference numeral 1 denotes a tread portion, reference numeral 2 denotes a sidewall portion and reference numeral 3 denotes a bead portion.

Two carcass plies 4 and 5 extend between right and left bead portions 3 in the tire, the carcass plies 4 and 5 having a rubber layer r and reinforcing cords f comprising cords of organic fiber such as polyester or rayon embedded therein, the reinforcing cords f extending in the radial direction of the tire and being arranged at prescribed intervals in the circumferential direction T of the tire. The two carcass plies 4 and 5 comprise an inner carcass ply 4 and an outer carcass ply 5. The inner carcass ply 4 has opposite end portions 4a which are each turned up around a bead core 6 embedded in a bead portion 3 from an axially inner side of the tire towards an axially outer side of the tire with a bead filler 7 being sandwiched. The outer carcass ply 5 has opposite end portions 5a which are each wrapped around the bead core 6 from the axially outer side of the tire towards the axially inner side of the tire.

The rubber layer r of each carcass ply 4, 5 is formed of rubber having a low dynamic elasticity modulus which is equal to or less than 5 MPa, thereby enhancing ride comfort. Note that the dynamic elasticity modulus referred here is a dynamic elasticity modulus when measured under conditions of a temperature of 60 degrees Celsius, an initial strain of 10%, an amplitude of ±2% and a vibration frequency of 20 Hz, using a viscoelastic spectrometer (made by Toyo Seiki Seisaku-sho).

Two belt plies 8 and 9 are provided radially outwardly of the carcass plies 4 and 5 in the tread portion 1, the belt plies 8 and 9 having a rubber layer u and reinforcing cords m such as steel cords embedded therein, the reinforcing cords m being obliquely arranged in the range of an angle which is equal to or greater than 25° and is less than 35° with respect to the circumferential direction T of the tire. The reinforcing cords m of the belt ply 8 are oblique toward one side with respect to the circumferential direction T of the tire, the reinforcing cords m of the belt ply 9 are oblique toward the other side with respect to the circumferential direction T of the tire, and the reinforcing cords m of the belt plies 8 and 9 cross with each other in such a manner that the oblique directions thereof with respect to the circumferential direction T of the tire are opposite.

A belt-reinforcing structure 10 is provided radially outwardly of the belt plies 8 and 9 as a cover member, the belt-reinforcing structure 10 having organic fiber cords n spirally wound in the circumferential direction T of the tire. The belt-reinforcing structure 10 includes a center reinforcement layer 10A and end reinforcement layers 10B, the center reinforcement layer 10A being disposed radially outwardly of a center region BC of the belt plies 8 and 9 in the axial direction of the tire, the end reinforcement layers 10B being disposed radially outwardly of end regions BE of the belt plies 8 and 9 located on the opposite sides of the center region BC in the axial direction of the tire. The center reinforcement layer 10A has an organic fiber cord na formed of organic fiber having an elastic modulus of 10000 MPa or less. As the organic fiber having an elastic modulus of 10000 MPa or less, nylon (nylon 66) fiber or polyethylene terephthalate (PET) fiber, for example, is preferably used. The lower limit of the elastic modulus of the organic fiber cord na is preferably 1000 MPa or more in terms of handling during processing.

Each end reinforcement layer 10B has an organic fiber cord nb, which comprises a hybrid cord having a filament of organic fiber having an elastic modulus of 10000 MPa or less and a filament of organic fiber having an elastic modulus higher than that of the organic fiber having an elastic modulus of 10000 MPa or less, the filaments being twisted together. As the organic fiber having an elastic modulus of 10000 MPa or less, the same one as in the above is preferably used. As the organic fiber having a higher elastic modulus, one having an elastic modulus of 30000 MPa or more is preferably used. Examples of the organic fiber having an elastic modulus of 30000 MPa or more can include aramid fiber, polyolefin ketone fiber, poly para-phenylene benzoxazole (POB) fiber and polyethylene naphthalate (PEN) fiber. Polyolefin ketone fiber is preferably used in terms of adhesion to rubber.

The hybrid cord can be obtained, for example, by bundling one or a plurality of filaments which are formed of organic fiber having an elastic modulus of 10000 MPa or less and twisted in one direction and one or a plurality of filaments which are formed of organic fiber having a higher elastic modulus and twisted in one direction, and by twisting them together in the opposite direction (the other direction).

Figure 3:
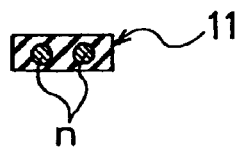
FIG. 3 is an enlarged cross-sectional view showing an example of a strip material used for the belt-reinforcing structure.
Figure 4:
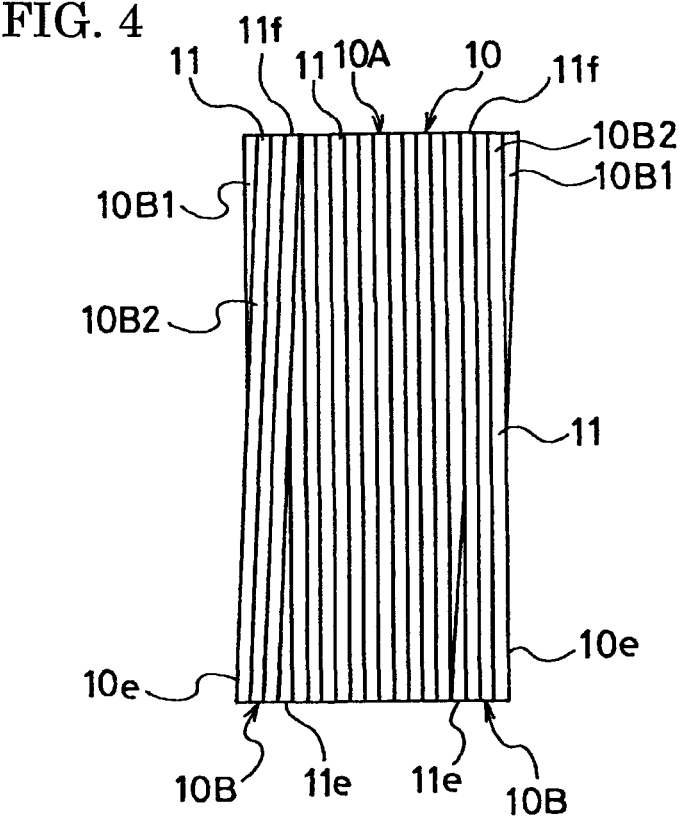
FIG. 4 is an explanatory drawing showing the belt-reinforcing structure having spirally wound strip materials in a state where it is developed around the entire circumference of the tire.
Figure 5A:
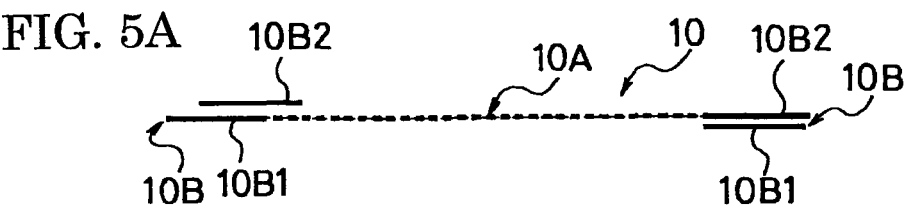
FIG. 5A is an explanatory drawing in cross section showing another example of the belt-reinforcing structure.
Figure 5B:
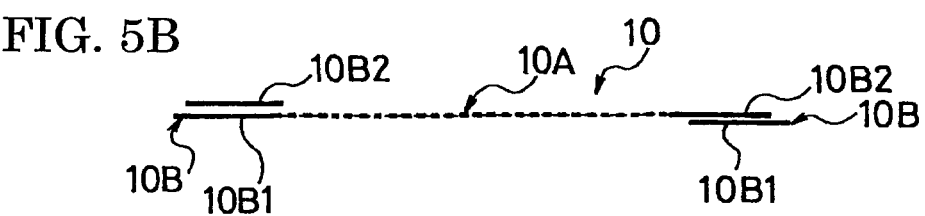
FIG. 5B is an explanatory drawing in cross section showing still another example of the belt-reinforcing structure.
Figure 5C:
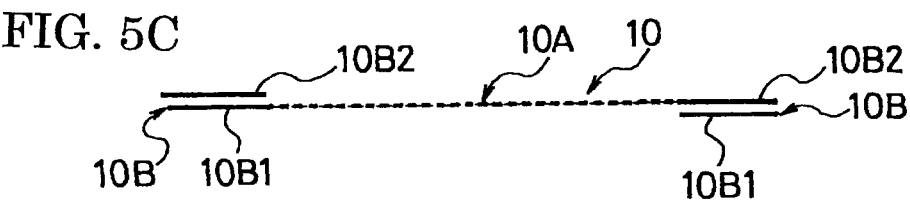
FIG. 5C is an explanatory drawing in cross section showing still another example of the belt-reinforcing structure.
Figure 5D:
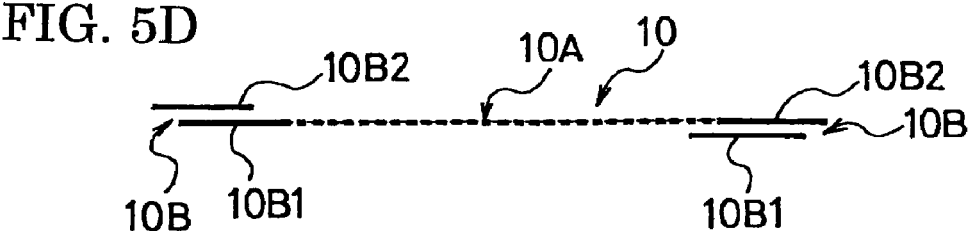
FIG. 5D is an explanatory drawing in cross section showing still another example of the belt-reinforcing structure.
Figure 6A:
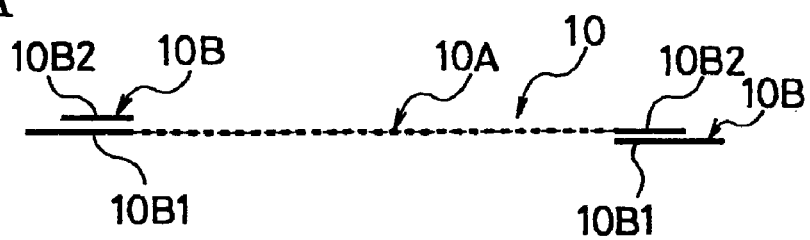
FIG. 6A is an explanatory drawing in cross section showing still another example of the belt-reinforcing structure.
Figure 6B:
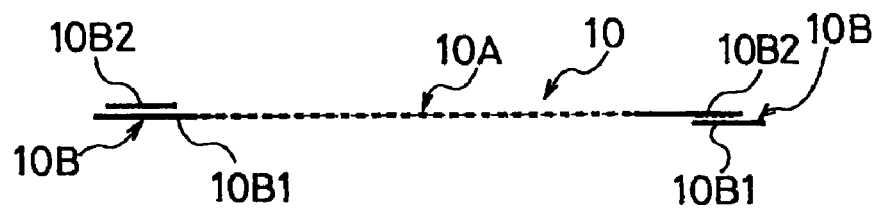
FIG. 6B is an explanatory drawing in cross section showing still another example of the belt-reinforcing structure.
Figure 6C:
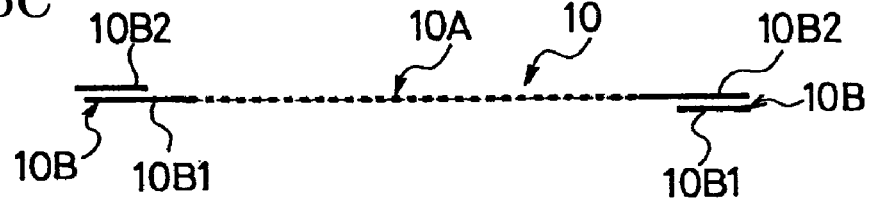
FIG. 6C is an explanatory drawing in cross section showing still another example of the belt-reinforcing structure.
Figure 6D:
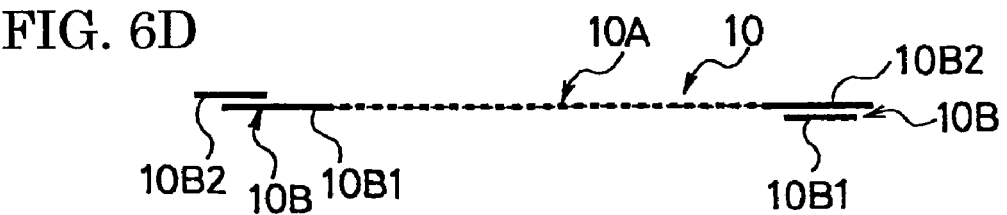
FIG. 6D is an explanatory drawing in cross section showing still another example of the belt-reinforcing structure.

As shown in FIG. 3, a strip material 11 having one or a plurality of organic fiber cords n covered with rubber is used for each of the center reinforcement layer 10A and end reinforcement layers 10B. As shown in FIG. 4, the center reinforcement layer 10A has a one-layer structure in which the strip material 11 is spirally wound in the circumferential direction T of the tire from one side toward the other side in the axial direction of the tire.

Each end reinforcement layer 10B is formed into a two-layer structure having a first end reinforcement layer part 10B1 adjacent to the belt ply 9 and a second end reinforcement layer part 10B2 disposed radially outwardly thereof by spirally winding at least one strip material 11 from an axially inner side of the tire toward an axially outer side of the tire, by turning it in the opposite direction at an edge 10e of the belt-reinforcing structure and by spirally winding it from the axially outer side of the tire toward the axially inner side of the tire. Opposite edges 11e and 11f of the strip material 11 are away inwardly in the axial direction of the tire from the edge 10e of the belt-reinforcing structure. That is, an organic fiber cord nb formed of the hybrid cord covered with rubber is spirally wound from the axially inner side of the tire toward the axially outer side of the tire, turned in the opposite direction at the edge 10e of the belt-reinforcing structure and further wound spirally from the axially outer side of the tire toward the axially inner side of the tire; opposite edges of the organic fiber cord nb are away inwardly in the axial direction of the tire from the edge 10e of the belt-reinforcing structure.

According to the present invention, the end reinforcement layer 10B has a two-layer structure as described above, whereby outer diameter growth in the ends of the belt plies where edge separation occurs can be restrained more effectively than before, enabling high-speed durability to be enhanced. On the other hand, vibration in the sidewall portions 2 can also be suppressed more effectively than before, enabling tire noise to be reduced.

In addition, since the opposite edges of the organic fiber cord nb of the end reinforcement layer 10B are away inwardly in the axial direction of the tire from the edge 10e of the belt-reinforcing structure which is subject to stress concentrations, occurrence of edge separation of the end reinforcement layer 10B is restrained, allowing high-speed durability to be further improved.

In the present invention, as the hybrid cord used for the organic fiber cord nb of the end reinforcement layer 10B, one having an inflection point of 2% or less in a stress-strain curve (S-S curve) is preferably used. This allows loosening of the hybrid cord arising from heat contraction in a cure process and a PCI (post-cure inflation) process after curing to be restrained. Therefore, vibration in the sidewall portions 2 and outer diameter growth in the belt ply ends can be even more effectively restrained. The lower limit of the inflection point is preferably 1% or more in terms of lifting applied to a green tire when cured. Such a hybrid cord having an inflection point of 2% or less can be obtained, for example, by suitably adjusting its twisting number and/or tension applied thereto in a dipping process.

In the above embodiment, the end reinforcement layer 10B is configured such that the first end reinforcement layer part 10B1 is substantially as equal in width as the second end reinforcement layer part 10B2 and the second end reinforcement layer part 10B2 is disposed on the first end reinforcement layer part 10B1 substantially in an entirely overlapping manner. However, an end reinforcement layer 10B placed radially outwardly of at least one end region BE of the belt plies 8 and 9 may be configured such that the second end reinforcement layer part 10B2 is disposed so as to be partially offset with respect to the first end reinforcement layer part 10B1 in the axial direction of the tire, as shown in each of FIGS. 5A to 5D, by spirally winding one strip material in a continuous manner. The first end reinforcement layer part 10B1 of the end reinforcement layer 10B on each side of the center reinforcement layer 10A shown in each of FIGS. 5A to 5D is substantially as equal in width as the second end reinforcement layer part 10B2 thereof.

The first end reinforcement layer part 10B1 and second end reinforcement layer part 10B2 may be configured such that they are different in width from each other, as shown in each of FIGS. 6A to 6D. In this case also, an end reinforcement layer 10B placed radially outwardly of at least one end region BE of the belt plies 8 and 9 is preferably configured such that the second end reinforcement layer part 10B2 is disposed so as to be partially offset with respect to the first end reinforcement layer part 10B1 in the axial direction of the tire by spirally winding one strip material in a continuous manner.

The present invention is preferably applicable to a pneumatic tire for passenger cars in particular, but there is no limitation thereto.

EXAMPLE

Prepared respectively were test tires according to the present invention tires 1 to 3, comparative tire and conventional tire, each having a tire size of 205/65R15, the present invention tires 1 to 3 having a construction shown in FIG. 1 in which the end reinforcement layer of the belt-reinforcing structure disposed radially outwardly of each end region of the belt plies was formed into a two-layer structure by spirally winding one strip material having an uncured rubber layer with a width of 10 mm and a thickness of 1.4 mm and eight hybrid cords embedded therein and in which the opposite edges of the strip material were away inwardly in the axial direction of the tire from the edge of the belt-reinforcing structure, the comparative tire having the same construction as the present invention tire 1 except that the end reinforcement layer of the belt-reinforcing structure was configured such that the opposite edges of the strip material were disposed at the edge of the belt-reinforcing structure, the conventional tire having the same construction as the present invention tire 1 except that the end reinforcement layer of the belt-reinforcing structure was formed into a one-layer structure by spirally winding one strip material which was the same as in the above.

The belt-reinforcing structure of each test tire is 120 mm in width. Nylon 66 is used for the organic fiber cord of the center reinforcement layer of the belt-reinforcing structure. In each of the present invention tires 1 and 2, comparative tire and conventional tire, hybrid cords [(1670 dtex, 1400 dtex)/2] of aramid fiber (1670 dtex) and nylon 66 (1400 dtex) are used for the hybrid cords of the end reinforcement layer. In the present invention tire 3, hybrid cords [(1670 dtex, 1400 dtex)/2] of polyolefin ketone fiber (1670 dtex) and nylon 66 (1400 dtex) are used for the hybrid cords of the end reinforcement layer. The inflection point of the hybrid cords of each test tire is as shown in Table 1.

In each of the present invention tires 1 to 3 and comparative tire, the width of the first end reinforcement layer part is 30 mm, and the width of the second end reinforcement layer part is 20 mm. In the conventional tire, the width of the end reinforcement layer is 30 mm. In each of the test tires, polyester cords (1670 dtex/2) are used for the reinforcing cords of the carcass plies, and the dynamic elasticity modulus of rubber with which the reinforcing cords are covered is 4.5 MPa.

The test tires were each assembled to a standard rim defined by JATMA and inflated to an air pressure of 240 kPa. Evaluation testing for high-speed durability and noise characteristics was carried out according to the following test methods, obtaining the results shown in Table 1.

High-Speed Durability

The test tires were each mounted on a test machine with a steel drum having a smooth drum surface and a diameter of 1707 mm, and run on the drum for 2 hours at a speed of 81 km/h controlling an ambient temperature in the range of 38±3 degrees Celsius. The test tires were then run for 20 minutes at a speed of 120 km/h, and thereafter subjected to speeds which increase by steps of 10 km/h every 20 minutes, measuring the speeds at which the test tires were destroyed. The evaluation results thereof are represented by an index where the conventional tire is 100. As the index is greater, high-speed durability is better.

Noise Characteristics

The respective test tires were mounted on a passenger car of 2500 cc displacement. The car was run on a test course, and feeling evaluation for noise in the car was conducted by a test driver. The evaluation results are represented by a five-point method where the conventional tire is 3. As the value is greater, noise is lower and noise characteristics are better.

TABLE 1

|  | Conventional Tire | Comparative Tire | Present Invention Tire 1 | Present Invention Tire 2 | Present Invention Tire 3 |
|---|---|---|---|---|---|
| Inflection Point (%) | 3 | 3 | 3 | 1.8 | 3 |
| High-Speed Durability | 100 | 100 | 120 | 125 | 125 |
| Noise Characteristics | 3 | 3.2 | 3.2 | 3.5 | 3.2 |

As seen from Table 1, the present invention tires can improve high-speed durability and noise characteristics compared with the conventional tire.

INDUSTRIAL APPLICABILITY

The present invention having the aforementioned excellent effects is preferably applicable to pneumatic tires used for passenger cars in particular.

What is claimed is:

1. A pneumatic tire having a carcass ply, belt plies being disposed radially outwardly of the carcass ply in a tread portion, a belt-reinforcing structure being provided radially outwardly of the belt plies, the belt-reinforcing structure having organic fiber cords spirally wound in a circumferential direction of the tire, the belt-reinforcing structure comprising a center reinforcement layer and end reinforcement layers, the center reinforcement layer being disposed radially outwardly of a center region of the belt plies, the end reinforcement layers being disposed radially outwardly of end regions of the belt plies located on opposite sides of the center region in an axial direction of the tire, the center reinforcement layer having an organic fiber cord formed of organic fiber having an elastic modulus of 10000 MPa or less, each end reinforcement layer having an organic fiber cord formed of a hybrid cord, the hybrid cord having a filament of organic fiber with an elastic modulus of 10000 MPa or less and a filament of organic fiber having an elastic modulus higher than that of the organic fiber with an elastic modulus of 10000 MPa or less, the filaments being twisted together, wherein the end reinforcement layer has a two-layer structure in which the hybrid cord is spirally wound from an axially inner side of the tire toward an axially outer side of the tire, is turned in an opposite direction at an edge of the belt-reinforcing structure and is spirally wound from the axially outer side of the tire toward the axially inner side of the tire, and in which opposite edges of the hybrid cord are away inwardly in the axial direction of the tire from the edge of the belt-reinforcing structure, and wherein the end reinforcement layer has a first end reinforcement layer part adjacent to the belt plies and a second end reinforcement layer part disposed radially outwardly of the first end reinforcement layer part, wherein the first end reinforcement layer part is substantially as equal in width as the second end reinforcement layer part, and wherein an end reinforcement layer placed radially outwardly of at least one end region of the belt plies is configured such that the second end reinforcement layer part is disposed so as to be partially offset with respect to the first end reinforcement layer part in the axial direction of the tire.

2. The pneumatic tire according to claim 1, wherein the hybrid cord has an inflection point of 2% or less in a stress-strain curve.

3. The pneumatic tire according to claim 2, wherein a lower limit of the inflection point is 1%.

4. The pneumatic tire according to claim 1, wherein the elastic modulus of the organic fiber having a higher elastic modulus is 30000 MPa or more.

5. The pneumatic tire according to claim 4, wherein the organic fiber having a higher elastic modulus is polyolefin ketone fiber.

6. The pneumatic tire according to claim 1, wherein the carcass ply comprises a rubber layer and reinforcing cords embedded therein, the reinforcing cords extending in the radial direction of the tire and being arranged at prescribed intervals in the circumferential direction of the tire, rubber of the rubber layer having a dynamic elasticity modulus of 5 MPa or less.

7. The pneumatic tire according to claim 1, wherein the end reinforcement layer comprises a strip-shaped material composed of a plurality of said hybrid cords covered in rubber.

* * * * *